Jan. 27, 1931.  G. MORRISON  1,790,592
MACHINE FOR REMOVING SKINS FROM PORK BELLIES
Filed Sept. 26, 1929  3 Sheets-Sheet 1
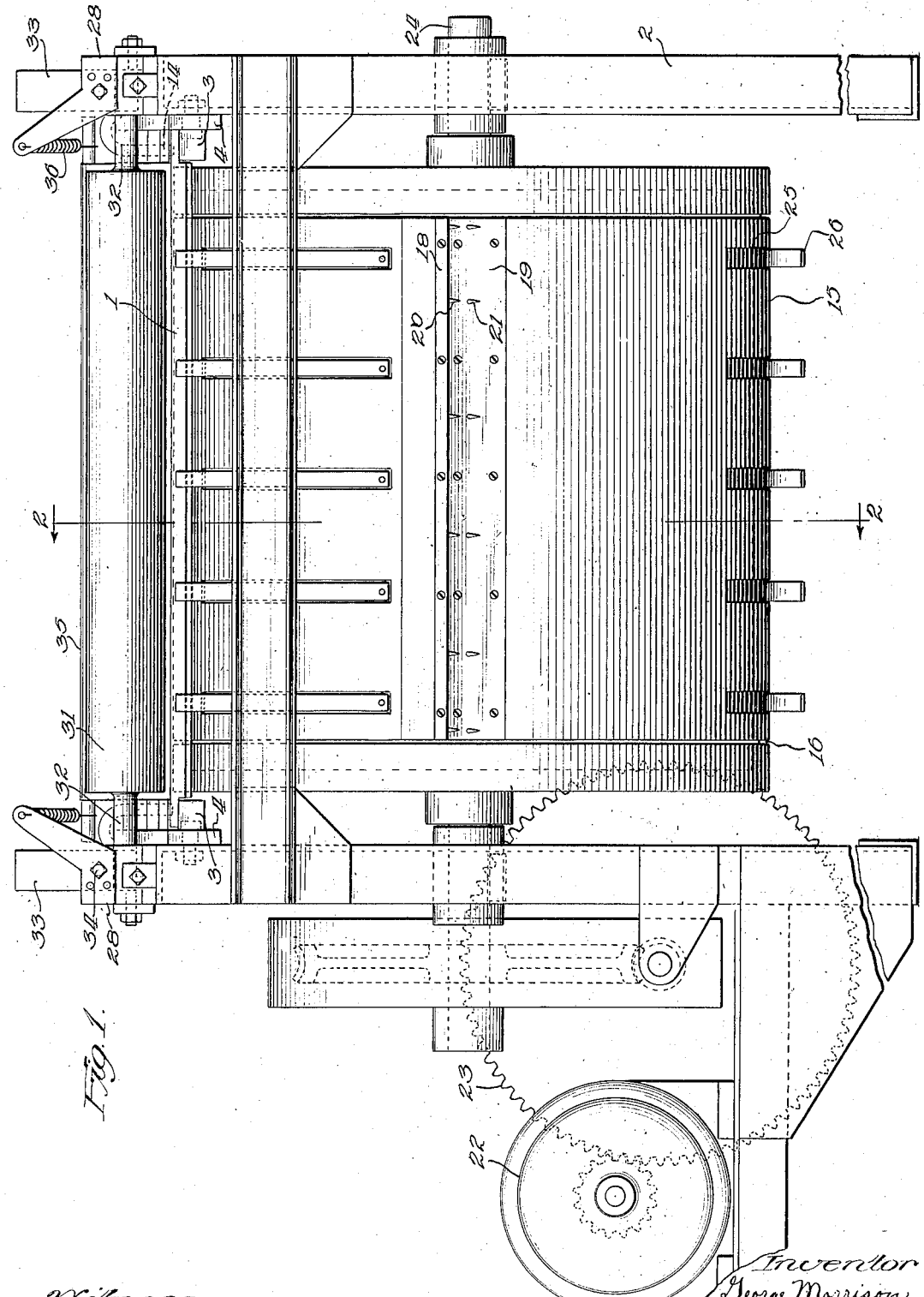

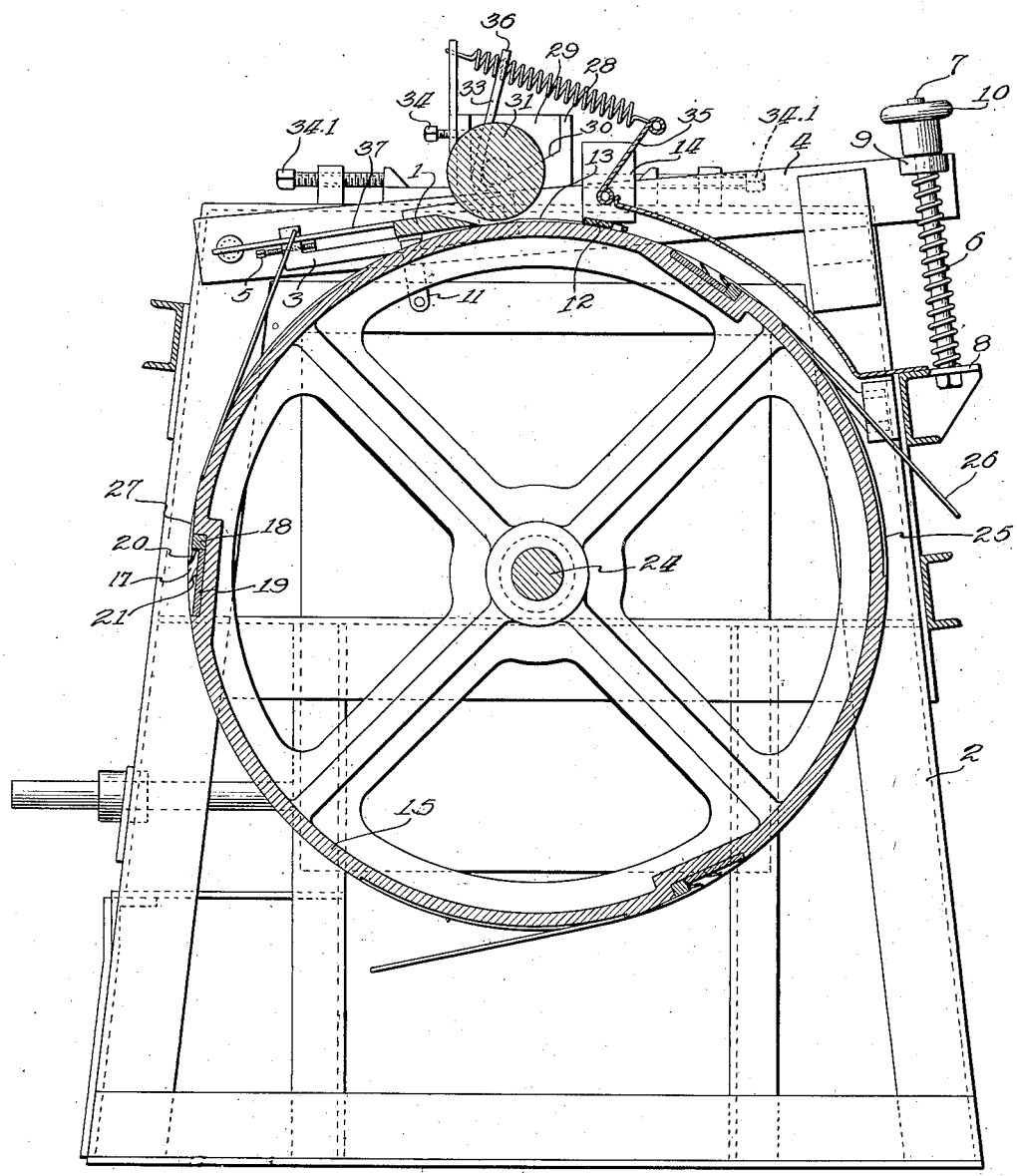

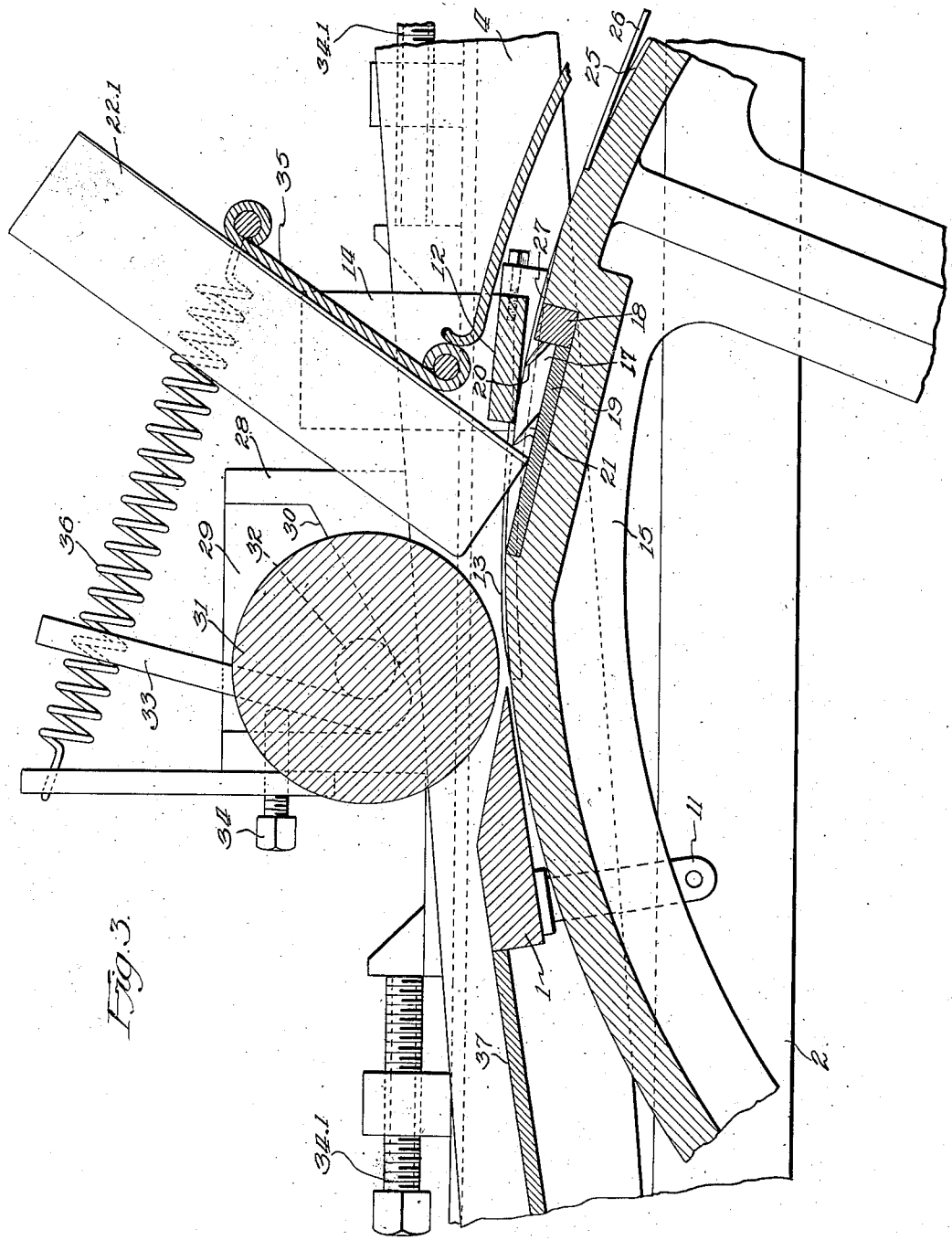

Patented Jan. 27, 1931

1,790,592

UNITED STATES PATENT OFFICE

GEORGE MORRISON, OF DENVER, COLORADO, ASSIGNOR TO SWIFT AND COMPANY, OF CHICAGO, ILLINOIS, A CORPORATION OF ILLINOIS

MACHINE FOR REMOVING SKINS FROM PORK BELLIES

Application filed September 26, 1929. Serial No. 395,319.

The main objects of this invention are to provide an improved method for removing the skin from a pork belly and severing the brisket part as a whole with the brisket flesh and skin intact; to provide an improved method for causing a skinning knife to follow along the flesh side of pork belly skins which are not uniform in thickness at their back and belly edge portions; to provide an improved belly skinning device in which a stationary skinning knife may be employed for effecting cuts of varying depth; to provide improved means in a device of this kind for feeding bellies to a skinning knife; to provide improved mechanism for attaching pork bellies to said feeding means and retaining them under tension while they are being severed by said knife; and to provide improved mechanism for ejecting the skin part of the bellies from the feeding means after it has been removed from the flesh.

In the form shown the improved pork belly skinning machine includes a frame on which a stationary skinning knife and a brisket knife are mounted. Rotatably mounted in the frame in a support or drum for moving pork bellies relative to the skinning and brisket knives. A floating feed roller of considerable weight is mounted on the frame above the drum for forcing pork bellies against the periphery of the drum.

An illustrative embodiment of my invention is shown in the accompanying drawings, wherein;

Figure 1 is a front end elevation of a belly skinning machine.

Fig. 2 is a horizontal section taken on the line 2—2 of Fig 1.

Fig. 3 is an enlarged fragmentary section showing parts of the skinning machine in detail.

In the device shown in the drawings the skinning knife 1 extends longitudinally of the frame 2, and is supported at its ends by adjustable brackets 3 carried by arms 4 which are secured at their rear extremities to the frame 2. The brackets are provided with bolts 5 by which they may be adjustably positioned. The forward ends of the arms 4 are each yieldably supported by a spring 6 which is mounted on a threaded rod 7. Each rod 7 is rigidly secured at its lower end to a bracket 8, and extends through an aperture in a lug 9 on the free ends of the arms 4. A nut 10 is provided on the upper end of each rod for adjustably positioning the cutting edge of the skinning knife.

Bearing against the skinning knife 1 is a heating element 11 which retains the knife at a desired temperature for facilitating rapid severing of the flesh part of a pork belly from the skin thereof.

Extending between the arms 4 is a brisket knife holder 12 on which a brisket knife 13 is removably mounted. An end feeding guide 14 is secured on the frame 2 at a distance from the brisket knife 13 substantially equal to the width of the brisket part of a pork belly.

Rotatably mounted in the frame 2 is a drum 15 having its axis substantially parallel to the length of the skinning knife 1. The periphery of the drum 15 is provided with circumferential grooves 16, each of which is adapted for receiving a brisket knife 13, and with longitudinally extending recesses 17 in which bars 18 and 19 are mounted. The bars 18 and 19 each carry a series of grab pins 20 and 21 respectively for attaching pork bellies to the periphery of the drum. Driving mechanism comprising a motor 22 and a train of gears 23 is operatively connected with the shaft 24 of the drum so as to rotate it in a counter-clockwise direction as viewed in Fig. 2. The periphery of the drum is also provided with circumferential recesses 25 for receiving skin knock-off bars 26 consisting of resilient metal strips which are secured at one end to the periphery of the drum.

The periphery of the drum 15 is milled off at the rear side of the recess 17 to provide a tapered recess 27 for receiving the thick skin parts of pork bellies which are located at the back portion of a hog. In this manner the flesh sides of the skins are held in registration with the cutting edge of the knife 1 even though the thickness of the skin varies considerably at the back and belly parts thereof.

Shiftably mounted on the ends of the frame 2 are bearing blocks 28 which have recesses 29 and inclined seats 30 formed in their adjacent sides. A floating feed roller 31, having reduced end portions 32 is supported by the blocks 29. The feed roller 31 preferably comprises solid metal material and its reduced ends 32 extend into the recesses 29 where they rest upon the inclined seat 30. The roller 31 is free to move towards the front of the machine but its rearward movement is limited by adjustable stops 33 which are mounted on the bearing blocks and held in desired positions by bolts 34. The bearing blocks are each provided with a pair of adjusting bolts 34.1 by which they may be positively held in a desired position for applying the weight of the feed roller on a belly in advance of the cutting knife 1.

A back feed guide 35 is pivotally mounted on the arms 4 and extends longitudinally of the frame 2 in front of the feed roller 31. This feed guide is usually held in an inclined position by a spring 36.

When the skinning machine is in operation the drum 15 is continuously rotated by the motor and gears 22 and 23 respectively, and a pork belly 22.1 is fed to the drum in the manner shown in Fig. 3.

The skin side of the belly is seated upon the back guide 35, and the edge of the belly which has the thicker skin portion is placed in the path of the grab pins 20 and 21. As the drum continues to rotate the front row of pins 21 pierces the thick skin portion of the back edge of the belly and drags the belly towards the skinning knife 1. The belly is moved in the direction of the skinning knife and is passed under the feed roller 31 which is adapted for horizontal, vertical and diagonal movements so as to accommodate irregularities in the thickness and on the surface of the pork belly. The weight of the feed roller acts as a drag on the pork belly, tensioning it, and causing the pins 20 and 21 to be forced into the skin.

Further rotation of the drum 15 moves the belly relative to the skinning knife and causes the cutting edge of the knife to be inserted substantially at the flesh surface of the skin. In this manner, the flesh part of the belly is severed from the skin and passes upwardly between the inclined side of the knife 1 and the feed roller 31, where it is deposited upon a rack comprising bars 37. The skin part of the belly is drawn beneath the skinning knife 1 and is finally removed from the periphery of the drum by the knock-off bars 26 which spring out from their recesses 25 as soon as the free ends of the bars have passed out of engagement with the knife 1.

When the belly is fed between the feed roller 31 and the drum 15, the shoulder end is placed against an end guide 14 with the brisket part of the belly lying between the brisket knife 13 and the guide. The weight of the feed roller 31 causes the belly to be pressed upon the cutting edge of the brisket knife, thereby severing the brisket portion before it reaches the skinning knife 1, and leaving the brisket flesh and skin intact.

The tapered recesses 27 which extend longitudinally of the periphery of the drum 15 accommodate the thick back portion of the skin and cause the cutting edge of the skinning knife 1 to closely follow the flesh surface of the skin completely removing the flesh from all portions of the skin and preventing waste of both flesh and skin parts.

Although but one specific embodiment of this invention has been herein shown and described, it will be understood that numerous details of the construction shown may be altered or omitted without departing from the spirit of this invention as defined by the following claims.

I claim:

1. A device for removing skins from pork bellies comprising a support, a skinning knife mounted on said support, a drum rotatably mounted on said support, means on said drum for attaching bellies thereto, a feed roller shiftably mounted on said support for forcing said attaching means into the skins of said bellies and tensioning said bellies, said roller being adapted for vertical horizontal and diagonal movements relative to said knife, and means for predetermining the distance between said knife and said feed roller.

2. A device for removing skins from pork bellies comprising a support, a skinning knife mounted on said support, a drum rotatably mounted on said support, means on said drum for attaching bellies thereto, a feed roller shiftably mounted on said support for forcing said attaching means into the skins of said bellies and tensioning said bellies, said roller being adapted for vertical, horizontal and diagonal movements relative to said knife, means for predetermining the distance between said knife and said feed roller, yieldable arms on said drum for disengaging the skins of said bellies from said drum after the flesh is removed.

3. A device for skinning pork bellies comprising a support, a skinning knife on said support, a drum rotatably mounted on said support for moving bellies edgewise relative to said knife; a pair of bearing blocks; one on each side of said frame; an inclined seat on each bearing block; a feed roller supported at its ends on said seats adapted to move vertically, horizontally and diagonally relative to said knife for accommodating irregularities in the thicknesses of said pork bellies; and adjustable means on said bearing blocks for normally holding said feed roller in a predetermined position during the commencement of feeding operations.

4. A device for skinning pork bellies comprising a support, a skinning knife on said support, a drum rotatably mounted on said support for moving bellies edgewise relative to said knife; a pair of bearing blocks; one on each side of said frame; an inclined seat on each bearing block; and a feed roller supported at its ends on said seats adapted to move vertically, horizontally and diagonally relative to said knife for accommodating irregularities in the thicknesses of said pork bellies.

5. A device for skinning pork bellies comprising a support, a skinning knife on said support, a drum rotatably mounted on said support for moving bellies edgewise relative to said knife; a pair of bearing blocks; one on each side of said frame; an inclined seat on each bearing block; a feed roller supported at its ends on said seats adapted to move vertically, horizontally and diagonally relative to said knife for accommodating irregularities in the thicknesses of said pork bellies; and a brisket knife below said roller for cutting off the brisket parts of said bellies.

6. A device for skinning pork bellies comprising a support, a pair of arms each pivotally mounted at one end on said support, a skinning knife extending longitudinally of said frame and attached at its ends to said arms, means for yieldably supporting the free ends of said arms, a drum rotatably mounted in said frame, the periphery of said drum being in close proximity to the cutting edge of said knife, and means on said drum for gripping a belly and drawing it edgewise against the cutting edge of said knife.

7. A machine for removing skins from pork bellies comprising a supporting structure, a drum rotatably mounted on said support, means for driving said drum, a skinning knife carried by said support in position to extend across the surface of the drum and remove the flesh part of pork bellies from the skin as the pork bellies are carried into engagement with the knife by the drum, means on the drum for gripping one edge of the skin of pork bellies and a recess in the drum adjacent said means, said recess being inclined with reference to the periphery of the drum for the purpose of accommodating the thick tapered portion of belly skins.

8. A machine for removing skins from pork bellies comprising a supporting structure, a drum rotatably mounted on said support, means for driving said drum, a skinning knife carried by said support in position to extend across the surface of the drum and remove the flesh part of pork bellies from the skin as the port bellies are carried into engagement with the knife by the drum, means on the drum for gripping one edge of the skin of pork bellies, and resilient skin knock-off strips carried by said drum.

Signed at Denver, this 19th day of September, 1929.

GEORGE MORRISON.